United States Patent [19]

Brandon et al.

[11] Patent Number: 5,137,223
[45] Date of Patent: Aug. 11, 1992

[54] PRECISION WIRE FEEDER FOR SMALL DIAMETER WIRE

[75] Inventors: Eldon D. Brandon; Frederick M. Hooper; Marvin L. Reichenbach, all of Albuquerque, N. Mex.

[73] Assignee: The United States of America as represented by the United States Department of Energy, Washington, D.C.

[21] Appl. No.: 506,126

[22] Filed: Apr. 9, 1990

[51] Int. Cl.$^5$ ............................................. B65H 59/04
[52] U.S. Cl. .................................. 242/54 R; 226/196; 226/187; 242/147 R
[58] Field of Search ..................... 242/54 R, 45, 147 R; 226/186, 187, 190, 196

[56] References Cited

U.S. PATENT DOCUMENTS

| | | | |
|---|---|---|---|
| 2,569,342 | 9/1951 | Scott | 242/45 |
| 3,018,975 | 1/1962 | Kulicke, Jr. | 242/54 R |
| 3,112,897 | 12/1963 | Eshbaugh et al. | 242/45 |
| 3,314,623 | 4/1967 | Blandino | 242/54 R |
| 3,406,888 | 10/1968 | Ramey | 226/187 |
| 3,442,429 | 5/1969 | McLellan | 226/186 |
| 3,506,176 | 4/1970 | Brown | 226/187 X |
| 3,578,228 | 5/1971 | Steiner | 226/191 X |
| 4,160,151 | 7/1979 | Tonita | 219/137.8 |
| 4,272,007 | 6/1981 | Steranko | 228/213 |
| 4,333,594 | 6/1982 | Cloos | 226/176 |
| 4,433,816 | 2/1984 | Rousseau | 242/129.62 |
| 4,456,198 | 6/1984 | Kosch | 242/54 R X |
| 4,932,581 | 6/1990 | Ohle et al. | 226/43 X |
| 4,944,464 | 7/1990 | Zelenka | 242/54 R |

OTHER PUBLICATIONS

K. Brown, "Fine Wire Feeder For Microplasma Welding", *Metal Construction and British Welding Journal*, Apr. 1969, pp. 169–173.

K. Brown, "Wire Drive Mechanisms", *Metal Construction and British Welding Journal*, Sep. 1969, pp. 407–412.

J. Needham, "Precision Wire Feed Systems", *The Welding Institute Research Bulletin*, Nov. 1980, pp. 340–346.

M. Watson, "Laser Welding of Structural Steel With Wire Feed", *Welding Institue Members, Report* No. 264, 1985.

K. Brown, "Wire Feeders Step Out! Concept and Prototype Construction", *The Welding Institue Research Bulletin*, Jul. 1986, pp. 223–228.

E. Brandon et al., "Characterization of a Precision Wire Feeder For Small-Diameter Wire", SAND 89–0235, Dec. 1989.

*Primary Examiner*—John M. Jillions
*Attorney, Agent, or Firm*—George H. Libman; James H. Chafin; William R. Moser

[57] ABSTRACT

A device for feeding small diameter wire having a diameter less than 0.04 mm (16 mil) to a welding station includes a driving wheel for controllably applying a non-deforming driving force to the wire to move the free end of the wire towards the welding station; and a tension device such as a torque motor for constantly applying a reverse force to the wire in opposition to the driving force to keep the wire taut.

11 Claims, 1 Drawing Sheet

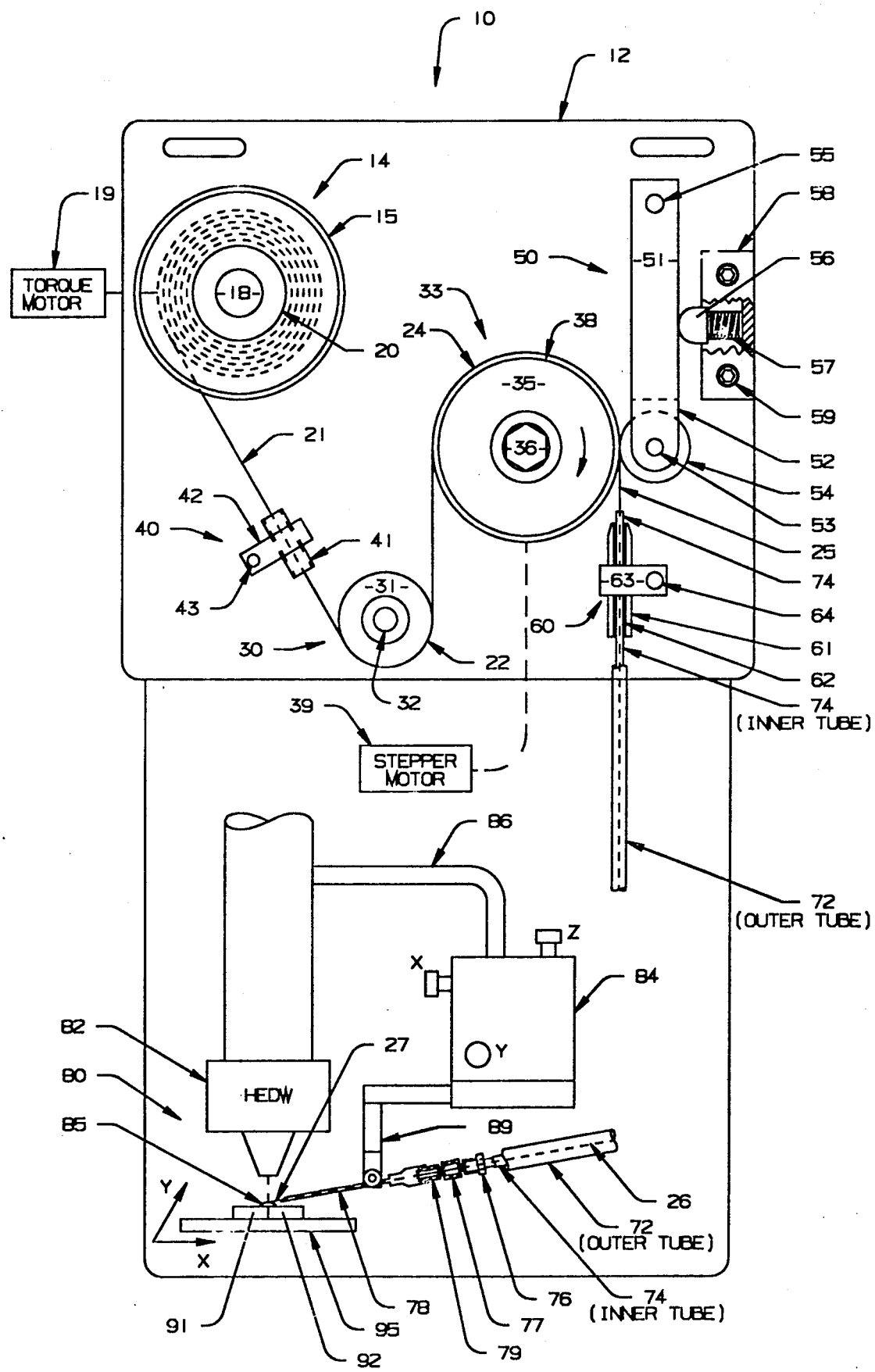

PRECISION WIRE FEEDER FOR SMALL DIAMETER WIRE

The United States Government has rights in this invention pursuant to Contract No. DE-AC04-76DP00789 between the Department of Energy and American Telephone and Telegraph Company.

BACKGROUND OF THE INVENTION

This invention relates generally to a controllable feeder for thin wire, and more particularly to a precision wire feeder for small diameter wire, particularly for welding operations.

High-energy density welding (HEDW) processes (i.e., electron beam and laser beam) are normally used autogenuously, without filler metal. However, the use of a filler wire is desirable when the geometry of a weld joint and an inherent gap or mismatch at the joint requires the use of a filler to provide joint closure or the desired weld geometry, or when the chemistry of the base metals is such that a filler metal is needed to adjust the chemical composition so that a crack-free weld can be attained.

U.S. Pat. No. 4,333,594 of E. Cloos discloses a prior art welding wire feeder having opposed planet guide rollers to drive a weld wire that is fed between the rollers.

U.S. Pat. No. 4,160,151 of P. Tonita discloses another welding wire feeder using opposed power driven wheels to drive the wire therebetween.

A synopsis of various drive mechanisms is provided by K. Brown, "Wire drive mechanisms", *Metal Construction and British Welding Journal*, Sept. 1969, page 407–412. One of these systems, the rotary wedge, is discussed in detail by K. Brown, "Fine wire feeder for microplasma welding", *Metal Construction and British Welding Journal*, Apr. 1969, pages 169–173.

The evolution of the rotary wedge, including a stepper motor drive, is discussed by K. Brown, "Wire feeders step out? Concept and prototype construction", *The Welding Institute Research Bulletin*, Jul. 1986, pages 223–228. The device discussed in this article uses a reserve loop between a constant speed capstan and a pulse driven capstan.

A wire feeder for HEDW processes must be capable of delivering a wire having a small diameter on the order of 0.25 mm (10 mils), or less, to a very small weld pool. The accurate, controlled, delivery of the free end of the wire to a precise location at a weld zone on a joint between adjacent pieces at a work station has been difficult to attain because of the obvious problems of kinking, breaking, and bending associated with this small wire. In addition, small diameter wire is notoriously difficult to accurately position.

SUMMARY OF THE INVENTION

It is an object of this invention to provide a compact wire feeder for small diameter wire.

It is another object of this invention to provide a wire feeder which keeps the wire taut.

It is also an object of this invention to accurately deliver a small diameter wire to a precise location.

It is still another object of this invention to provide a feeder capable of pulse-feeding a small diameter wire.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a source of small diameter wire having a free end; a driving means for controllably applying a driving force to the wire to move the free end of the wire towards a weld zone and apparatus for constantly applying a reverse force to the wire in opposition to the driving force to keep the wire taut.

BRIEF DESCRIPTION OF THE DRAWING

The accompanying drawing, which is incorporated in and forms part of the specification, illustrates an embodiment of the present invention and, together with the description, serves to explain the principles of the invention.

The FIGURE shows a schematic view of a wire feeder in accordance with the invention.

DETAILED DESCRIPTION OF THE INVENTION

As shown in the FIGURE 1 a precision feeder 10 for small diameter wire 20–27 having a diameter less than 0.04 mm (16 mil) to a welding station 80 includes a base plate 12 upon which wire source 14, wire guide 40, idler 30, capstan drive 33, bias device 50 and output feed means 60 are mounted. Typically, plate 12 is small enough (on the order of 16 by 12.5 cm (6.5 by 5 inches)) that it may be mounted by known means near high energy density welder 82.

In the following description, there is only one spool 15 of wire 20 having a free end 27 at welding station 80. However, portions of the wire between the free end 27 and the spool 15 are designated by numbers indicative of a location along the path of the wire.

At welding station 80, an X-Y table 95 may move two adjacent pieces of metal to be welded, 91, 92, in a predetermined path such that a weld pool 85 caused by the focused energy from welder 82 forms at the joint between pieces 91, 92. Alternatively, welder 82 may be moved by known means along the joint between pieces 91, 92.

In either of the aforementioned embodiments, precision feeder 10 must accurately place free end 27 at weld pool 85.

Wire source 14 includes a spool 15 of small diameter wire 20 mounted on plate 12 and freely rotatable about an axis 18. As discussed in greater detail hereinafter, axis 18 represents the output shaft of a torque motor 19 mounted to the opposite side of plate 12 from spool 15.

Wire guide 40 is illustrated as including a cylindrical tube 41 fastened to plate 12 by clamp 42 and fastener 43 to guide wire 21 from spool 20 to a surface 22 of idler pulley 31, which pulley is freely rotatably mounted to plate 12 for rotation about axis 32. Because of the change in wire direction caused by idler 30, wire 23 approaches capstan drive 33 from a direction sufficient to ensure that drive 33 imparts traction over an appreciable length of wire 24.

Capstan drive 33 includes a drive wheel 35 having a diameter much larger than the diameter of wire 20. Wheel 35 is mounted for rotation about an axis 36 representative of the drive shaft of a stepper motor 39 mounted to plate 12 opposite wheel 35. A sufficient length of wire 24 is in friction contact with the circumference of wheel 35 to ensure that wire 20 is moved toward weld zone at weld pool 85 when motor 39 causes axis 36 to rotate in a clockwise direction, as viewed in FIGURE 1.

Although the capstan drive is well known in the art, the drive wheel 35 of this invention is uniquely constructed for improved performance. In particular, the circumference of metal drive wheel 35 includes a layer 38 of polyurethane or other elastomer upon which wire 24 rests when in contact with capstan drive 33. Although wire 24 eventually cuts a track in material 38, the material still grips wire 24 and imparts the improved traction of the invention.

Pressure assembly 50 keeps wire 24 in contact with layer 38 of capstan wheel 35. Assembly 50 preferably includes a support arm 51 attached to plate 12 at one end by pivot 55. The opposite end of arm 51 includes two opposed fingers 52 having a unidirectional ball bearing 54 mounted for rotation in only the counterclockwise direction around axis 53. The surface of bearing 54 is pressed against wire 24 and capstan wheel 35 by a spring-loaded plunger 56, contained in block 58, fastened to plate 12 by fasteners 59. Bearing 54, which may be grooved to help keep wire 24 from sliding axially along the circumference of wheel 35, allows wire 20 to be driven by wheel 35 towards the weld zone at weld pool 85, but prevents torque motor 19 from moving wire 20 away from the weld zone when motor 39 is not operating.

Once wire 25 leaves capstan drive 33, successful operation requires a delivery system that accurately places wire end 27 at a desired location. However, the delivery system also must impart only a minimum friction to the wire, to prevent it from buckling as it is pushed towards weld pool 85.

As shown in FIGURE 1, wire 25 feeds through a plastic inlet adapter 61 and a teflon guide tube 74. Adapter 61 has a longitudinal slot 62 for the operator's use in placing tube 74 (containing wire 25) in adapter 61 Clamp 63 is attached to plate 12 by fastener 64 to hold adapter 61 rigidly against plate 12. The end of tube 74 is aligned tangentially with the point of contact of bearing 54 on wheel 35, and extends towards that point to minimize the unsupported distance wire 25 will be pushed by wheel 35.

Guide tube 74 is sized to guide wire 26 to the weld zone with minimal friction, as discussed hereinafter. The output of adapter 61 may be aligned with a second, concentric, outer Teflon support tube 72, to optionally provide physical support for guide tube 74.

As shown in the enlarged portion of FIGURE 1, the output end of tube 74 is connected to a conventional medical hypodermic needle 78 by a hollow brass fitting 76 that slides into tube 74 and screws into one end of hollow phenolic adapter 77. The other end of adapter 77 has a Luer taper 79 that fastens to the input end of hypodermic needle 78 in a conventional manner.

Needle 78 is rigidly affixed to move with welder 82 by rigid mounting arms 86, 89 and X-Y-Z positioner 84, a commercially available device with manual adjustments to permit the operator to accurately position needle 78 such that the wire output 27 from needle 78 is at the proper angle and location for feeding weld pool 85.

A wire feeder 10 in accordance with this invention has been constructed using the following components:

Stepper motor 39 — Compumotor Model 57-102; 25,000 steps per revolution, 120 ounce force inches torque at <6 rps.

Torque motor 19 — Bodine Model KLI-16, set to apply approximately 4 ounces tension to wire 20.

Capstan drive Wheel 35 — 0 4.7 cm (1.85 inch) diameter by 2.5 cm (1 inch) wide anodized aluminum; outer surface coated with polyurethane and machined to a final diameter of 5 cm (2 inches).

Pressure roller 54 — 19 mm (0.75 inch) by 13 mm (0.5 inch) unidirectional ball bearing spring loaded against wheel 35 with 90 ounce force.

Outer tube 72 — AWG 15; 1.4 mm (0.054 inch) i.d. ×2.3 mm (0.089 inch) o.d.

Inner tube 74 — AWG 24; (0.5 mm (0.02 inch) i.d. ×1.1 mm (0.044 inch) o.d.

Hypodermic needle 78 — B-D Yale, 25 gauge.

Stepper motor 39 is controlled either by a Compumotor Model 21 manual indexer or a Compumotor Model 32 microprocessor The particular device used to control motor 39 is well within the ordinary skill of the motor control art, and does not constitute a part of this invention.

The most notable advantage of this invention is that it works. Small diameter wires are inherently subject to deformation by the drive rollers, breakage caused by suddenly removing slack in the line when the drive motor starts, kinking caused by any friction in the line, and difficult accurate placement of the tip. Unlike a conventional friction brake which would require a higher initial pull on the wire to overcome static friction against supply spool 15 than the subsequent pull necessary to keep the spool rotating against dynamic friction, torque motor 19 provides a constant, accurate, control of the reverse force. The combination of torque motor 19 pulling wire 20 in the reverse direction against the force of one-way bearing 54, which bearing does not permit the wire to go away from weld zone at weld pool 85, eliminates the possibility of slack between spool 15 and capstan 33 when motor 39 is stopped.

In addition, the use of torque motor 19 eliminates the need for spring-biased idler wheels or friction brakes, as is conventional in the art. The variations in spring tensions and friction of such devices are often not sensitive enough for reliable operation with small diameter wire.

In addition, the use of a relatively soft coating on drive wheel 35 has been found to accurately and positively drive wire 20 without deformation of the wire.

Finally, the use of hypodermic needle 78 to inexpensively and accurately deliver the wire to the weld pool is another unique feature of this invention.

Tests of the device at wire feed speeds up to 13 meters/ minute (500 in/min) yielded satisfactory welds. By changing only the hypodermic needle 78 from one having an inside diameter of 0.33 mm 0.013 inch) to one having an inside diameter of 0.2 mm (0.008 inch), wire having a diameter of 0.13 mm (0.005 inch) was fed at a rate of 2.5 meters/minute (100 in/min).

Satisfactory welds were demonstrated using a $CO_2$ laser beam welder at table travel speeds from 50 to 100 cm/min (20 to 40 in/min) at a wire feed speed of 5 meters/minute (200 in/min). The direction of feeding the wire into the weld pool (relative to the motion of table 95) was found to be insignificant, as was the angle of the needle to the table within a range of 20° to 50° to the horizontal.

The tests did show that the wire tip 27 must be placed in and be melted by weld pool 85 to avoid interrupting the weld, as occurred when the wire was fed directly into the beam from welder 82. Since a 1000 watt welder does not form a large weld pool, the tip of needle 78 must be within 3 mm (0.125 inch) of the weld pool to ensure accurate wire placement.

Tests were made on joint gaps in stainless steel in the range of 0.25 mm 0.01 in) to 0.75 mm (0.03 in) wide and 0.25 mm (0.01 in) to 2.5 mm (0.1 in) deep. Gaps as large as 0.03 by 0.03 inches are readily filled, but gaps 0.1 inches deep could only be bridged by focusing the beam adjacent to the groove and adding wire to achieve a weld of adequate size to fuse the joint.

A complete discussion of the tests of the wire feeder was done by E. Brandon et al., "Characterization of a Precision Wire Feeder for Small-Diameter Wire", SAND89-0235, Dec. 1989, the text of which report is incorporated herein by reference.

The particular sizes and equipment discussed above are cited merely to illustrate a particular embodiment of this invention. It is contemplated that the use of the invention may involve components having different sizes and shapes as long as the principle discussed herein is followed. For example, a curve could be placed in needle 78 for more accurate placement of wire 20. In addition, a continuous drive motor could be used in place of stepper motor 39. Also, heat-shrink tubing could be placed over wheel 35 in place of polyurethane coating 38. It is intended that the scope of the invention be defined by the claims appended hereto.

We claim:

1. A device for feeding small diameter wire having a diameter less than 0.4 mm (16 mil) to a welding station, said device comprising:
   a source of small diameter wire, said wire having a free end;
   driving means for controllably applying a non-deforming driving force to said wire to move the free end of said wire towards the welding station, said driving means comprising:
      a drive wheel in driving contact with said wire over more than a point contact portion of the circumference of said wheel; and
      drive motor means connected to controllably rotate said wheel;
   tension means for constantly applying a reverse force to said wire in opposition to said driving force to keep the wire taut; and
   unidirectional means for pressing said wire against said wheel, said means permitting movement of said wire towards said work station when said drive motor is rotating said wheel, and preventing movement of said sire towards said source of wire when said drive motor is not rotating said wheel.

2. The device of claim 1 wherein said unidirectional means consists of a unidirectional roller.

3. The device of claim 2 wherein said roller surface includes a circumferential groove for retaining the wire between said roller and said wheel.

4. The device of claim 1 wherein the circumference of said wheel is an elastomer capable of being deformed by said wire.

5. The device of claim 4 wherein said drive wheel is metal and the circumference of said wheel is polyurethane.

6. The device of claim 1 wherein said source of wire comprises a spool of wire mounted for rotation in a first direction about an axis.

7. The device of claim 6 wherein said tension means comprises a torque motor for applying a tension force to rotate said spool in a second direction opposite said first direction, said tension force being less than said driving force.

8. The device of claim 1 further comprising a hollow guide tube having one end adjacent said driving means, said tube guiding said wire towards said welding station.

9. The device of claim 8 wherein said guide tube is contained within and supported by a concentric hollow support tube.

10. A device for feeding small diameter wire having a diameter less than 0.4 mm (16 mil) to a welding station, said device comprising:
    a source of small diameter wire, said wire having a free end;
    driving means for controllably applying a non-deforming driving force to said wire to move the free end of said wire towards the welding station;
    a hollow guide tube having one end adjacent said driving means, said tube guiding said wire towards said welding station; and
    a hypodermic needle mounted adjacent said welding station and connected to the other end of said guide tube, said needle having a tip from which said wire passes to said welding station, and an inside diameter no larger than three times the diameter of said wire.

11. The device of claim 10 further comprising tension means at said source for constantly applying a reverse force to said wire in opposition to said driving force to keep the wire taut.

* * * * *